(12) United States Patent
Spall et al.

(10) Patent No.: US 8,141,692 B2
(45) Date of Patent: *Mar. 27, 2012

(54) CHECK-PROCESSING DEVICE WITH SINGLE IMAGE CAMERA

(75) Inventors: J. Michael Spall, Oakland, MI (US); Johan P. Bakker, Brighton, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/319,058

(22) Filed: Dec. 31, 2008

(65) Prior Publication Data

US 2010/0164170 A1  Jul. 1, 2010

(51) Int. Cl.
*G07F 7/04* (2006.01)

(52) U.S. Cl. ......... 194/206; 194/207; 271/65; 271/186; 271/291; 399/364; 235/475; 235/480

(58) Field of Classification Search ............... 235/440, 235/439, 475, 480; 271/186, 65, 291, 3.14; 194/206, 207; 209/534; 399/364
See application file for complete search history.

(56) References Cited

U.S. PATENT DOCUMENTS

| | | | | |
|---|---|---|---|---|
| 4,456,237 A * | 6/1984 | Buddendeck | | 271/3.05 |
| 4,714,241 A * | 12/1987 | Randall | | 271/3.03 |
| 6,081,687 A * | 6/2000 | Munemori et al. | | 399/374 |
| 6,103,985 A * | 8/2000 | Shell et al. | | 209/587 |
| 6,257,783 B1 * | 7/2001 | Hanaoka et al. | | 400/578 |
| 6,640,521 B2 * | 11/2003 | Simkins et al. | | 53/460 |
| 7,021,757 B2 * | 4/2006 | Kida | | 347/104 |
| 7,258,500 B2 * | 8/2007 | Furihata et al. | | 400/188 |
| 7,486,421 B2 * | 2/2009 | Yang | | 358/474 |
| 2010/0166288 A1 * | 7/2010 | Spall et al. | | 382/137 |

* cited by examiner

*Primary Examiner* — Jeffrey Shapiro
(74) *Attorney, Agent, or Firm* — Honigman Miller Schwartz and Cohn LLP

(57) ABSTRACT

An apparatus for capturing images from checks and other financial and payment-related documents includes a base unit including an input slot for receiving a document to be processed. A transport stage located within the base unit receives the document from the input slot. The transport stage includes a document track, a processing device located along the document track, and a one-way gate located along the document track after the processing device. The document track includes a second, return path extending from a location at the one-way gate to a location before the processing device. A bi-directional drive mechanism receives the document as the document passes through the one-way gate in the forward direction. The bi-directional drive mechanism then reverses direction to drive the document in the reverse direction. The one-way gate is arranged to divert the document traveling in the reverse direction into the second, return path and re-introduce the document to the processing device with the document now in a reverse orientation.

18 Claims, 1 Drawing Sheet

CHECK-PROCESSING DEVICE WITH SINGLE IMAGE CAMERA

BACKGROUND OF THE INVENTION

1. Field of the Invention

The invention relates to document processing, and to compact, desktop document processors for capturing images from checks and other financial and payment-related documents.

2. Background Art

Historically, banks processed large volumes of paper checks in centralized locations, either a central bank or a clearing house. Document processing machines in such locations were large, processing up to 2000 documents per minute. These machines were supported by dedicated, trained operators.

However, centralized processing costs banks typically three days in clearing a document. The "Check Clearing for the 21st Century Act" or the "Check 21 Act" was enacted by Congress to facilitate check truncation by authorizing substitute checks, to foster innovation in the check collection system without mandating receipt of checks in electronic form, and to improve the overall efficiency of the Nation's payments system. The Check 21 legislation has driven the demand for decentralized check imagers and sorters in financial institutions. Check 21 gives equal legal validity to electronic data obtained from documents, and has made it possible for banks to distribute document processing to speed the clearing process. Check 21 has made it advantageous for banks to convert paper checks to electronic data as early as possible.

In the recent past, banks have partially converted paper check information to electronic data. In some cases this partial information was used internally. In other cases two banks would agree on standards for electronic data transfer. In either case, the paper check was still the only legal document for the transaction. Check 21 has standardized these agreements across the banking industry, and given the electronic data legal merit, if the electronic data meet the requirements set forth in Check 21.

Accordingly, Check 21 has led to a rapid expansion of check-processing solutions based upon interchange of electronic images rather than paper checks, and with this there has been a flood of smaller, cheaper check-processing devices which all have the aim of capturing check images ever-more-early in the payment transaction. This process, known as truncation, aims to remove the physical paper check from the process of payment clearing as quickly as possible—ideally, at the point of presentment (cashier station, merchant counter, etc.). Because it is advantageous for banks to convert paper checks to Check 21 valid electronic data as early as possible, compact, desktop document processors have been developed. Some of these payment system devices are designed for use on a counter top, or at a teller window.

As check-processing machines directed at the check-imaging truncation market become ever-smaller and cheaper, the proportional cost of digital image-capture means relative to the whole cost of the machine becomes ever-greater. Current check-processing machines have two digital image-capture devices, one for capturing the front image and another for capturing the rear image.

Workers in the art will be familiar with the growing range of check-processing machines which are being offered in response to the growth of digital-image-based check-clearing systems. In a process known generically as truncation, these machines seek to move the conversion from paper check to digital image ever-closer to the point of presentment, and so the market is filled with devices which are tailored to point-of-presentment use—at a teller window, at the merchant counter, and at the checkout station. Such devices must be small (to save valuable retail space), and they must be cheap to buy and own (to make their purchase and use attractive and to encourage the spread of truncation as widely as possible). However, compared to the check-processing machines of even the recent past, their processing speed need not be very fast—a transaction rate of 2 or 3 checks per minute may be perfectly-adequate in the truncation environment, where in the past machines have been required to operate as much as 1000 times faster than this.

The primary function of such machines is to capture a digital image of both sides of the check. To achieve this function, such machines conventionally drive the check by a system of, for example, belts and rollers in between two digital imaging devices or cameras, one capturing an image of the front face of the check and the other capturing an image of the rear face of the check as it passes by. Such cameras typically operate as linear scanning devices, the complete image being formed form a series of linear scans performed as the check moves past the camera.

There have been various technological generations of such image cameras, and the most-commonly used current embodiment is the contact image scanner, a linear device which uses rod-lens technology to capture images of passing documents which are held against the face of an integral glass screen.

CIS cameras, while efficient and of moderate cost when compared with previous generations of this technology, still form a significant part of the product cost of the latest generation of check-processing devices. This cost proportion is due, not only to the cost of the devices themselves, but also to the cost of the supporting electronics and associated power supply that each camera requires.

For the foregoing reasons, there is a need for a small, low-cost check-processing machine which has the capacity to capture digital images of both faces of a check.

SUMMARY OF THE INVENTION

In one embodiment of the invention, an apparatus for capturing images from checks and other financial and payment-related documents is provided. The apparatus comprises a compact, desktop document processor base unit including an input slot for receiving a document to be processed. A transport stage located within the base unit receives the document from the input slot. The transport stage includes a document track, a processing device located along the document track, and a one-way gate located along the document track after the processing device. The document track includes a second, return path extending from a location at the one-way gate to a location before the processing device. A bidirectional drive mechanism receives the document as the document passes through the one-way gate in the forward direction. The bi-directional drive mechanism then reverses direction to drive the document in the reverse direction. The one-way gate is arranged to divert the document traveling in the reverse direction into the second, return path and re-introduce the document to the processing device with the document now in a reverse orientation.

Embodiments of the invention comprehend various additional features that may be appropriate, depending on the document processing application.

For example, the transport stage may further comprise a pair of drive rollers and associated idler rollers which cooperate to form the document track. One of the drive rollers may form the bi-directional drive mechanism.

Further, the processing device may be an image camera. In this case, the image camera images a first side of the document as the document passes the image camera in a forward orientation, and images a second side of the document as the document passes the image camera in the reverse orientation.

Further, the processing device may be a printing mechanism. In this case, the printing mechanism prints on a first side of the document as the document passes the printing mechanism in a forward orientation, and prints on a second side of the document as the document passes the printing mechanism in the reverse orientation.

It is also possible that the apparatus includes both an image camera and a printing mechanism.

Further, it is appreciated that embodiments of the invention are suitable for compact, desktop document processing applications. However, embodiments of the invention may also be implemented with feeder and transport stages that are not limited to the compact, desktop document processor base unit.

DETAILED DESCRIPTION OF THE PREFERRED EMBODIMENTS

Figure 1:
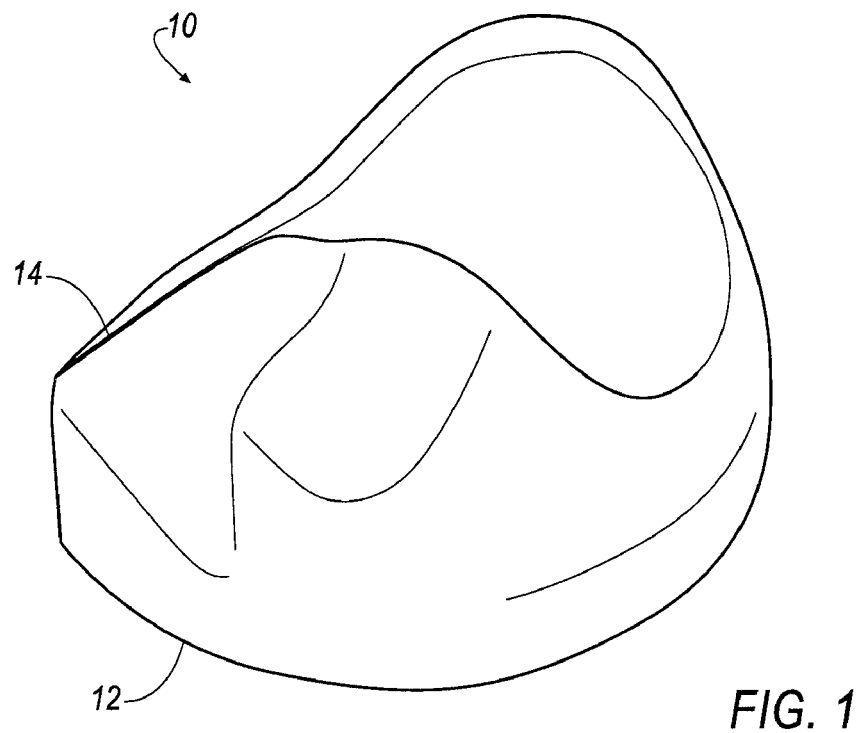
FIG. 1 illustrates a compact, desktop document processor in an embodiment of the invention.

As shown in FIG. 1, a compact, desktop document processor is generally indicated at 10. The apparatus 10 includes base unit 12, and input slot 14 for receiving a check or other document to be processed. In general, apparatus 10 is used for decentralized document processing applications. The input slot 14 provides the operator with an area to place a document to be processed, and assists with document alignment.

The apparatus 10 may be constructed to perform any number of known document processing actions as appreciated by one of ordinary skill in the art. Suitable electronics and mechanical mechanisms are located within base unit 12. For example, apparatus 10 may perform front and rear image capture. Other mechanisms could also be located in base unit 12, depending on the application. Advantageously, the electronics and mechanical mechanisms required for the document processing actions are provided within base unit 12 as readily understood by one of ordinary skill in the art. The apparatus 10 may be provided with a suitable network connection interface such as Universal Serial Bus (USB). It is appreciated that apparatus 10 is suitable for processing checks as well as other financial and payment-related documents.

The apparatus 10 is an example of a document processor for which embodiments of the invention may be used. Embodiments of the invention may also be implemented in other devices.

Figure 2:
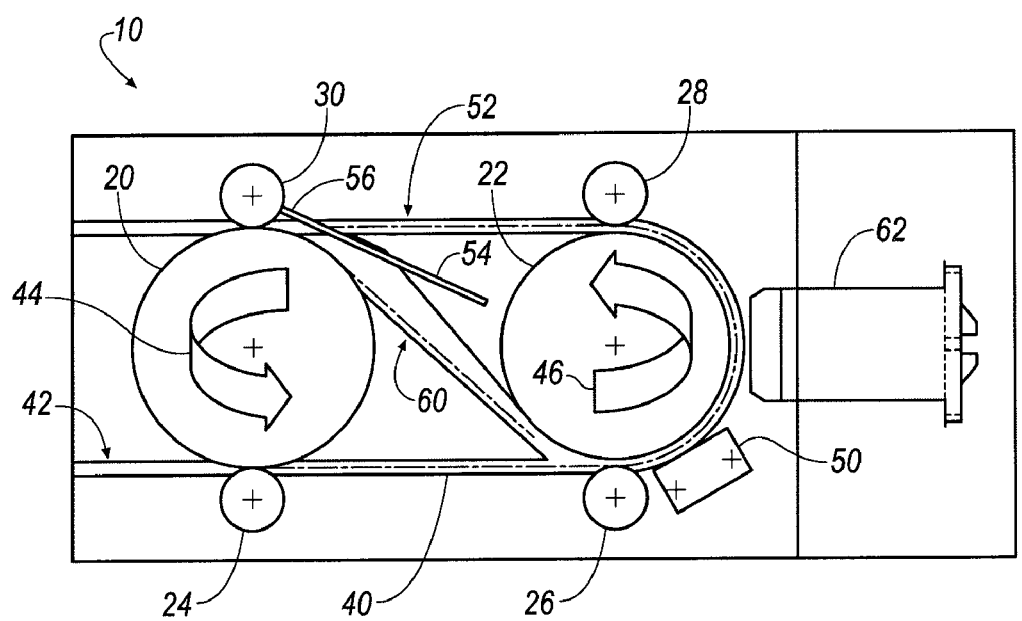
FIG. 2 illustrates a schematic view of the document processor, showing the single image camera and repeatably-reversible track direction.

With reference to FIG. 2, the illustrated embodiment includes a pair of cylindrical drive rollers 20, 22 and associated spring-loaded idlers 24, 26, 28, 30 which together form a document guide track 40 of approximately-oval form. Workers will understand that the basic track form may be supplemented by conventional document guide walls and the like, which are not specifically shown.

The cylindrical drive rollers 20, 22 are each individually driven by a suitable electric motor, and at least one of them (the left-hand roller 20 in the particular embodiment shown) is capable of being bi-directionally driven.

When a document to be processed is inserted into the machine in the entrance track portion 42 shown, both drive rollers 20, 22 are rotating in a counter-clockwise direction as indicated by arrows 44, 46, and the document is thus driven along the track, past an image camera 50 which captures an image of one face of the document, and around the periphery of the right-hand roller 22.

As the leading edge of the document passes through the track section 52 between the two rollers 20, 22, it passes through a one-way gate 54 which is actuated at 56 by the document itself. When the trailing edge of the document passes through the gate at 56, the left-hand drive roller 20 reverses its direction and the document commences to move in the opposite direction. The trailing edge becomes the leading edge, and it encounters the one-way gate 54 in the other direction. The one-way gate 54 then directs the document into a second path 60 between the two rollers 20, 22, which re-introduces the document into the right-hand drive roller 22 in a reversed orientation. As the document proceeds around the right-hand drive roller 22, the opposite face is presented to the image camera 50, which then captures a digital image of it. The distance from the one-way gate 54, through the second path 60 and around the right-hand drive roller 22 is so arranged as to be longer than the longest document that will be fed into the machine 10, thus ensuring that the leading and trailing edges of a document will never coincide. When the trailing edge of the document leaves the left-hand drive roller 20, that roller 20 immediately reverses its direction of rotation so as to be ready to accept and drive the leading edge of the same document as it appears at the one-way gate 54. In this manner, a single image camera 50 can be used to capture images of both faces of a single document.

Workers will understand that this principle is not limited to image cameras. There are other processes, such as printed endorsements, which are sometimes required to be performed upon checks being processed, and which may be required to be performed on both faces. Furthermore, in some embodiments, it may be desirable for these endorsements to be captured as part of the digital images of the check. Conventionally, such endorse means would be provided by two printing mechanisms, one for each side of the check. By a similar application of the invention, endorsement capability can be provided on both faces of the check using only one printing mechanism 62, also shown in FIG. 2.

In such a case, the single printing mechanism 62 could be provided as shown in FIG. 2, and workers will understand that by repeatedly cycling a document through the machine as described above, with each cycle causing the document to reverse its orientation in the track 40, it is possible to endorse and/or image both faces of a document using only a single endorse device 62 and a single image-capture device 50, and that it is possible to perform these tasks in any desired sequence by selecting which process is applied during which cycle.

Workers will further understand that the track layout shown is merely exemplary and that many variations of entry, exit and transport location/direction are possible without altering the principle of operation. Further, it is appreciated that document tracking within the apparatus, when appropriate, may be achieved in any suitable way. For example, the document may be tracked by detecting the document with the image camera. In another example, conventional sensors or switches may be located along the document track for detecting the passing document.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for capturing images from checks and other financial and payment-related documents, the apparatus comprising:
   a compact, desktop document processor base unit including an input slot for receiving a document to be processed;
   a transport stage located within the base unit and receiving the document from the input slot, the transport stage including a document track, a processing device located along the document track, and a one-way gate located along the document track after the processing device;
   the document track including a second, return path extending from a location at the one-way gate to a location before the processing device; and
   a bi-directional drive mechanism for receiving the document as the document passes through the one-way gate in the forward direction, the bi-directional drive mechanism then reversing direction to drive the document in the reverse direction, the one-way gate being arranged to divert the document traveling in the reverse direction into the second, return path and re-introduce the document to the processing device with the document now in a reverse orientation.

2. The apparatus of claim 1 wherein the transport stage further comprises:
   a pair of drive rollers and associated idler rollers which cooperate to form the document track.

3. The apparatus of claim 2 wherein one of the drive rollers forms the bidirectional drive mechanism.

4. The apparatus of claim 1 wherein the processing device is an image camera, thereby allowing the image camera to image a first side of the document as the document passes the image camera in a forward orientation, and to image a second side of the document as the document passes the image camera in the reverse orientation.

5. The apparatus of claim 4 wherein the transport stage further comprises:
   a pair of drive rollers and associated idler rollers which cooperate to form the document track, wherein one of the drive rollers forms the bi-directional drive mechanism.

6. The apparatus of claim 1 wherein the processing device is a printing mechanism, thereby allowing the printing mechanism to print on a first side of the document as the document passes the printing mechanism in a forward orientation, and to print on a second side of the document as the document passes the printing mechanism in the reverse orientation.

7. The apparatus of claim 6 wherein the transport stage further comprises:
   a pair of drive rollers and associated idler rollers which cooperate to form the document track, wherein one of the drive rollers forms the bi-directional drive mechanism.

8. The apparatus of claim 1 wherein the processing device is an image camera, thereby allowing the image camera to image a first side of the document as the document passes the image camera in a forward orientation, and to image a second side of the document as the document passes the image camera in the reverse orientation; and
   wherein the transport stage further comprises a printing mechanism, thereby allowing the printing mechanism to print on a first side of the document as the document passes the printing mechanism in a forward orientation, and to print on a second side of the document as the document passes the printing mechanism in the reverse orientation.

9. The apparatus of claim 8 wherein the transport stage further comprises:
   a pair of drive rollers and associated idler rollers which cooperate to form the document track, wherein one of the drive rollers forms the bi-directional drive mechanism.

10. An apparatus for capturing images from checks and other financial and payment-related documents, the apparatus comprising:
    a feeder stage for receiving a document to be processed;
    a transport stage receiving the document from the feeder stage, the transport stage including a document track, a processing device located along the document track, and a one-way gate located along the document track after the processing device;
    the document track including a second, return path extending from a location at the one-way gate to a location before the processing device; and
    a bi-directional drive mechanism for receiving the document as the document passes through the one-way gate in the forward direction, the bi-directional drive mechanism then reversing direction to drive the document in the reverse direction, the one-way gate being arranged to divert the document traveling in the reverse direction into the second, return path and re-introduce the document to the processing device with the document now in a reverse orientation.

11. The apparatus of claim 10 wherein the transport stage further comprises:
    a pair of drive rollers and associated idler rollers which cooperate to form the document track.

12. The apparatus of claim 11 wherein one of the drive rollers forms the bi-directional drive mechanism.

13. The apparatus of claim 10 wherein the processing device is an image camera, thereby allowing the image camera to image a first side of the document as the document passes the image camera in a forward orientation, and to image a second side of the document as the document passes the image camera in the reverse orientation.

14. The apparatus of claim 13 wherein the transport stage further comprises:
    a pair of drive rollers and associated idler rollers which cooperate to form the document track, wherein one of the drive rollers forms the bi-directional drive mechanism.

15. The apparatus of claim 10 the processing device is a printing mechanism, thereby allowing the printing mechanism to print on a first side of the document as the document passes the printing mechanism in a forward orientation, and to print on a second side of the document as the document passes the printing mechanism in the reverse orientation.

16. The apparatus of claim 15 wherein the transport stage further comprises:

a pair of drive rollers and associated idler rollers which cooperate to form the document track, wherein one of the drive rollers forms the bi-directional drive mechanism.

17. The apparatus of claim 10 wherein the processing device is an image camera, thereby allowing the image camera to image a first side of the document as the document passes the image camera in a forward orientation, and to image a second side of the document as the document passes the image camera in the reverse orientation; and wherein the transport stage further comprises a printing mechanism, thereby allowing the printing mechanism to print on a first side of the document as the document passes the printing mechanism in a forward orientation, and to print on a second side of the document as the document passes the printing mechanism in the reverse orientation.

18. The apparatus of claim 17 wherein the transport stage further comprises:

a pair of drive rollers and associated idler rollers which cooperate to form the document track, wherein one of the drive rollers forms the bi-directional drive mechanism.

* * * * *